(12) United States Patent  
Bittner et al.

(10) Patent No.: US 9,276,939 B2
(45) Date of Patent: Mar. 1, 2016

(54) MANAGING USER ACCESS TO QUERY RESULTS

(71) Applicant: INTERNATIONAL BUSINESS MACHINES CORPORATION, Armonk, NY (US)

(72) Inventors: Torsten Bittner, San Jose, CA (US); Leugim A. Bustelo, Austin, TX (US); Abraham G. Guerra, Brewster, NY (US); Peter J. Parente, Durham, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/109,753

(22) Filed: Dec. 17, 2013

(65) Prior Publication Data
US 2015/0172293 A1 Jun. 18, 2015

(51) Int. Cl.
H04L 29/06 (2006.01)
G06F 17/27 (2006.01)
G06F 17/30 (2006.01)
G06F 21/60 (2013.01)
G06F 21/62 (2013.01)

(52) U.S. Cl.
CPC ............... H04L 63/10 (2013.01); G06F 17/27 (2013.01); G06F 17/30 (2013.01); G06F 21/60 (2013.01); G06F 21/6245 (2013.01)

(58) Field of Classification Search
USPC .......................................................... 726/4
See application file for complete search history.

(56) References Cited

U.S. PATENT DOCUMENTS

| 7,748,027 | B2 | 6/2010 | Patrick |
| 7,876,335 | B1 | 1/2011 | Pittenger et al. |
| 7,913,167 | B2 | 3/2011 | Cottrille |
| 2006/0253418 | A1 | 11/2006 | Charnock et al. |
| 2010/0023463 | A1 | 1/2010 | Walker et al. |
| 2011/0029622 | A1 | 2/2011 | Walker et al. |
| 2011/0119361 | A1* | 5/2011 | Issa et al. ...................... 709/223 |
| 2011/0125734 | A1 | 5/2011 | Duboue et al. |
| 2011/0153312 | A1* | 6/2011 | Roberts ............................ 704/9 |
| 2011/0247081 | A1 | 10/2011 | Shelton |
| 2012/0084112 | A1* | 4/2012 | Bagchi et al. ................. 705/7.14 |
| 2012/0303558 | A1* | 11/2012 | Jaiswal ........................ 706/12 |
| 2013/0167249 | A1* | 6/2013 | Birtwhistle et al. ............. 726/28 |
| 2014/0006012 | A1* | 1/2014 | Zhou et al. ........................ 704/9 |
| 2014/0149322 | A1* | 5/2014 | LaVoie et al. .................. 706/12 |
| 2014/0280087 | A1* | 9/2014 | Isensee et al. ................ 707/723 |
| 2015/0026106 | A1* | 1/2015 | Oh et al. ........................ 706/12 |

* cited by examiner

Primary Examiner — Kambiz Zand
Assistant Examiner — Aubrey Wyszynski
(74) Attorney, Agent, or Firm — Paul S. Drake

(57) ABSTRACT

A system or computer usable program product for redacting QA system answer information based on user access to content including analyzing a corpus by natural language processing techniques, wherein the corpora includes non-sensitive and sensitive content, and storing the analyzed corpora in memory; receiving a user question to be answered by utilizing the analyzed corpora; utilizing a processor to determine a set of answer information by processing using the corpora; determining a user access right to sensitive content; and redacting an answer information item from the set of answer information if sensitive content to which the user does not have access was used to determine the answer information item.

18 Claims, 11 Drawing Sheets

FIG. 8A

| Document ID 802 | Sensitivity 804 | Document 806 |
|---|---|---|

FIG. 8B

| Document ID 822 | Sensitivity 824 | Type 826 | Reliability 828 | Indices 830 |
|---|---|---|---|---|

FIG. 8C

| Question Type 842 | Classification 844 | Profile 846 | Other 848 | Weights 850 |
|---|---|---|---|---|

FIG. 8D

| NLP Question 862 | Answers 864 | Sensitivity 866 | Confidence 868 | Other 870 |
|---|---|---|---|---|

FIG. 8E

| User ID 882 | Password 884 | User Profile 886 | Credentials 888 |
|---|---|---|---|

MANAGING USER ACCESS TO QUERY RESULTS

BACKGROUND

1. Technical Field

The present invention relates generally to managing user access to query results, and in particular, to a computer implemented method for selectively redacting query results based on data source restrictions and user privileges.

2. Description of Related Art

With the use and improvement of natural language processing (NLP), computers are becoming better at processing human originated speech and writings. Human language is very complex and includes a variety of ambiguities and uncertainties that are difficult for computers to manage. Hand written rules have been developed to assist in this process, but were insufficient to solve the complexity of problems encountered in analyzing human language. Subsequently, statistical models were developed and more recently statistical machine learning techniques have been utilized to improve NPL substantially.

NLP has been utilized in a variety of applications including spelling and grammar correction in documents being typed, summarizing text or documents, language translation, and for providing answers to user queries. In many of these applications, NLP is utilized in multiple capacities. For example, in providing answers to use queries, a computer may have utilized NLP for analyzing a multitude of documents (corpora) in electronic form to develop a content database with indices to the underlying documents. The corpora can include human generated documents, machine translated documents, web pages, etc. that were produced or captured in electronic form. This content database can then be utilized to rapidly search and access the underlying corpora, thereby quickly providing an answer to a user in response to a user query that is also analyzed with NLP.

SUMMARY

The illustrative embodiments provide a system and computer usable program product for redacting QA system answer information based on user access to content including analyzing a corpus by natural language processing techniques, wherein the corpora includes non-sensitive and sensitive content, and storing the analyzed corpora in memory; receiving a user question to be answered by utilizing the analyzed corpora; utilizing a processor to determine a set of answer information by processing using the corpora; determining a user access right to sensitive content; and redacting an answer information item from the set of answer information if sensitive content to which the user does not have access was used to determine the answer information item.

BRIEF DESCRIPTION OF THE SEVERAL VIEWS OF THE DRAWINGS

The novel features believed characteristic of the invention are set forth in the appended claims. The invention itself, further objectives and advantages thereof, as well as a preferred mode of use, will best be understood by reference to the following detailed description of illustrative embodiments when read in conjunction with the accompanying drawings, wherein:

FIGS. 8A to 8E are block diagrams of types of database records in which various embodiments may be implemented.

DETAILED DESCRIPTION

Processes and devices may be implemented and utilized for managing user access to query results. These processes and apparatuses may be implemented and utilized as will be explained with reference to the various embodiments below.

Figure 1:
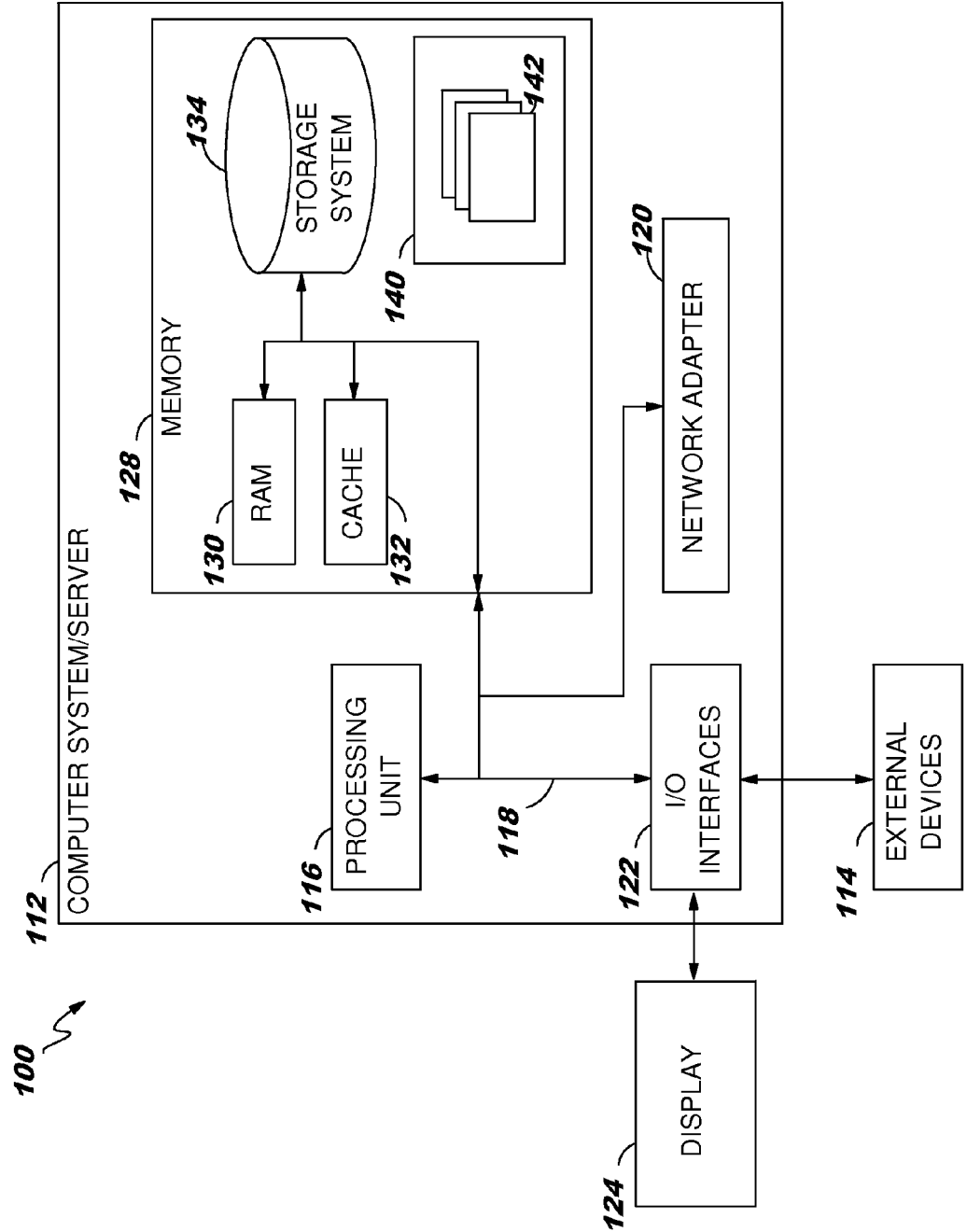
FIG. 1 is a block diagram of an illustrative data processing system in which various embodiments of the present disclosure may be implemented.

FIG. 1 is a block diagram of an illustrative data processing system in which various embodiments of the present disclosure may be implemented. Data processing system 100 is one example of a suitable data processing system and is not intended to suggest any limitation as to the scope of use or functionality of the embodiments described herein. Regardless, data processing system 100 is capable of being implemented and/or performing any of the functionality set forth herein such as managing user access to query results.

In data processing system 100 there is a computer system/server 112, which is operational with numerous other general purpose or special purpose computing system environments, peripherals, or configurations. Examples of well-known computing systems, environments, and/or configurations that may be suitable for use with computer system/server 112 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 112 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 112 may be practiced in distributed computing environments where tasks are performed by remote processing devices that are linked through a communications network. In a distributed computing environment, program modules may be located in both local and remote computer system storage media including memory storage devices.

As shown in FIG. 1, computer system/server 112 in data processing system 100 is shown in the form of a general-purpose computing device. The components of computer system/server 112 may include, but are not limited to, one or more processors or processing units 116, a system memory 128, and a bus 118 that couples various system components including system memory 128 to processor 116.

Bus 118 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 112 typically includes a variety of non-transitory computer system readable media. Such media may be any available media that is accessible by computer system/server 112, and it includes both volatile and non-volatile media, removable and non-removable media.

System memory 128 can include non-transitory computer system readable media in the form of volatile memory, such as random access memory (RAM) 130 and/or cache memory 132. Computer system/server 112 may further include other non-transitory removable/non-removable, volatile/non-volatile computer system storage media. By way of example, storage system 134 can be provided for reading from and writing to a non-removable, non-volatile magnetic media (not shown and typically called a "hard drive"). Although not shown, a USB interface for reading from and writing to a removable, non-volatile magnetic chip (e.g., a "flash drive"), and an optical disk drive for reading from or writing to a removable, non-volatile optical disk such as a CD-ROM, DVD-ROM or other optical media can be provided. In such instances, each can be connected to bus 118 by one or more data media interfaces. Memory 128 may include at least one program product having a set (e.g., at least one) of program modules that are configured to carry out the functions of the embodiments. Memory 128 may also include data that will be processed by a program product.

Program/utility 140, having a set (at least one) of program modules 142, may be stored in memory 128 by way of example, and not limitation, as well as an operating system, one or more application programs, other program modules, and program data. Each of the operating system, one or more application programs, other program modules, and program data or some combination thereof, may include an implementation of a networking environment. Program modules 142 generally carry out the functions and/or methodologies of the embodiments. For example, a program module may be software for managing user access to query results.

Computer system/server 112 may also communicate with one or more external devices 114 such as a keyboard, a pointing device, a display 124, etc.; one or more devices that enable a user to interact with computer system/server 112; and/or any devices (e.g., network card, modem, etc.) that enable computer system/server 112 to communicate with one or more other computing devices. Such communication can occur via I/O interfaces 122 through wired connections or wireless connections. Still yet, computer system/server 112 can communicate with one or more networks such as a local area network (LAN), a general wide area network (WAN), and/or a public network (e.g., the Internet) via network adapter 120. As depicted, network adapter 120 communicates with the other components of computer system/server 112 via bus 118. It should be understood that although not shown, other hardware and/or software components could be used in conjunction with computer system/server 112. Examples, include, but are not limited to: microcode, device drivers, tape drives, RAID systems, redundant processing units, data archival storage systems, external disk drive arrays, etc.

Figure 2:
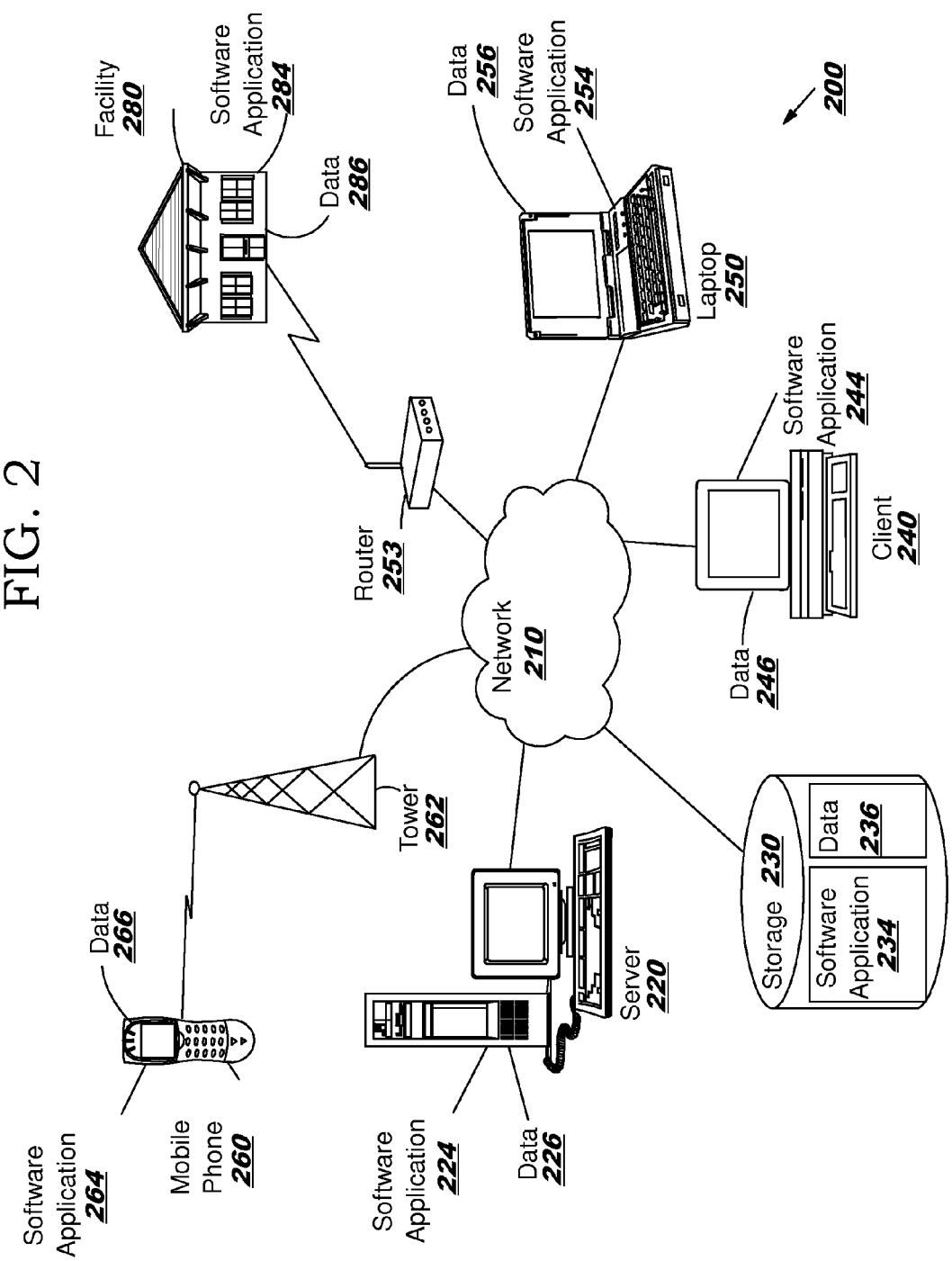
FIG. 2 is a block diagram of an illustrative network of data processing systems in which various embodiments of the present disclosure may be implemented.

FIG. 2 is a block diagram of an illustrative network of data processing systems in which various embodiments of the present disclosure may be implemented. Data processing environment 200 is a network of data processing systems such as described above with reference to FIG. 1. Software applications such as for managing user access to query results may execute on any computer or other type of data processing system in data processing environment 200. Data processing environment 200 includes network 210. Network 210 is the medium used to provide simplex, half duplex and/or full duplex communications links between various devices and computers connected together within data processing environment 200. Network 210 may include connections such as wire, wireless communication links, or fiber optic cables.

Server 220 and client 240 are coupled to network 210 along with storage unit 230. In addition, laptop 250 and facility 280 (such as a home or business) are coupled to network 210 including wirelessly such as through a network router 253. A mobile phone 260 may be coupled to network 210 through a mobile phone tower 262. Data processing systems, such as server 220, client 240, laptop 250, mobile phone 260 and facility 280 contain data and have software applications including software tools executing thereon. Other types of data processing systems such as personal digital assistants (PDAs), smartphones, tablets and netbooks may be coupled to network 210.

Server 220 may include software application 224 and data 226 for managing user access to query results or other software applications and data in accordance with embodiments described herein. Storage 230 may contain software application 234 and a content source such as data 236 for managing user access to query results. Other software and content may be stored on storage 230 for sharing among various computer or other data processing devices. Client 240 may include software application 244 and data 246. Laptop 250 and mobile phone 260 may also include software applications 254 and 264 and data 256 and 266. Facility 280 may include software applications 284 and data 286. Other types of data processing systems coupled to network 210 may also include software applications. Software applications could include a web browser, email, or other software application for managing user access to query results.

Server 220, storage unit 230, client 240, laptop 250, mobile phone 260, and facility 280 and other data processing devices may couple to network 210 using wired connections, wireless communication protocols, or other suitable data connectivity. Client 240 may be, for example, a personal computer or a network computer.

In the depicted example, server 220 may provide data, such as boot files, operating system images, and applications to client 240 and laptop 250. Server 220 may be a single computer system or a set of multiple computer systems working together to provide services in a client server environment. Client 240 and laptop 250 may be clients to server 220 in this example. Client 240, laptop 250, mobile phone 260 and facility 280 or some combination thereof, may include their own data, boot files, operating system images, and applications. Data processing environment 200 may include additional servers, clients, and other devices that are not shown.

In the depicted example, data processing environment 200 may be the Internet. Network 210 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 200 also may be implemented as a number of different types of networks, such as for example, an intranet, a local area network (LAN), or a wide area network (WAN). FIG. 2 is intended as an example, and not as an architectural limitation for the different illustrative embodiments.

Among other uses, data processing environment 200 may be used for implementing a client server environment in which the embodiments may be implemented. A client server environment enables software applications and data to be distributed across a network such that an application functions by using the interactivity between a client data processing system and a server data processing system. Data processing environment 200 may also employ a service oriented architecture where interoperable software components distributed across a network may be packaged together as coherent business applications.

Figure 3:
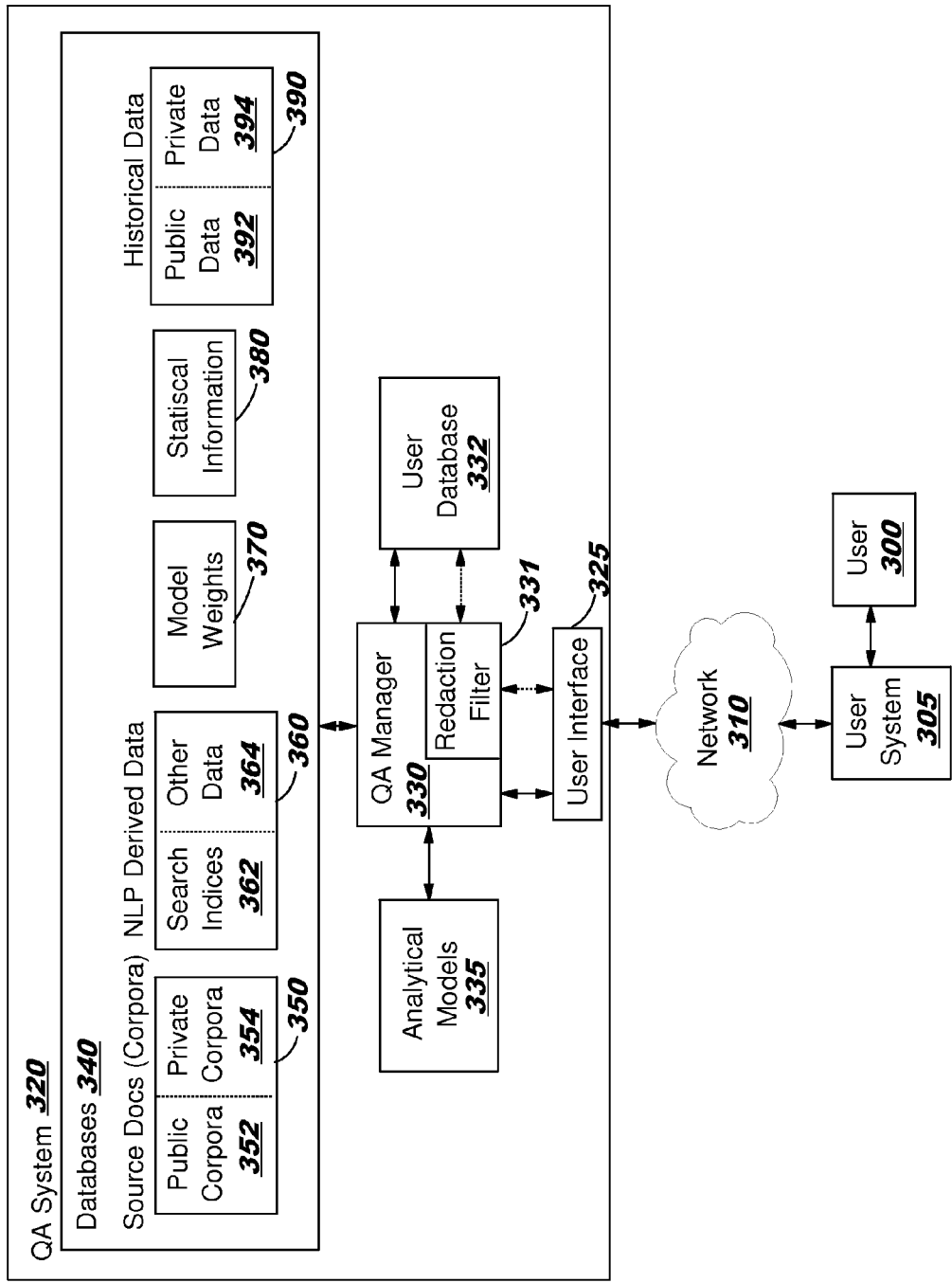
FIG. 3 is a block diagram of a question and answer (QA) system in which various embodiments may be implemented.

FIG. 3 is a block diagram of a question and answer (QA) system in which various embodiments may be implemented. This system is an example for illustrative purposes. Many alternative embodiments could be implemented with similar functionality by one of ordinary skill in the art.

A user 300 utilizes a user system 305 to communicate with QA system 320 across a network 310. The user may be within a company or other small entity communicating with a locally implemented QA system across an internal network system. The user may also be any person worldwide communicating with a QA system located on a remote server or in the cloud. User system 305 may be an application implemented on a mobile phone, an internet browser located on a computer with access to the internet, or any other type of implementation with capability to provide communications between user 300 and QA system 320 across any type of network 310. User system 305 may include multiple computing devices in communication with each other and with other devices or components via one or more wired and/or wireless data communication links, where each communication link may comprise one or more of wires, routers, switches, transmitters, receivers, or the like. User system 305 may include a computer with a displayed menu or other readable program suitable for the user to type in a question and to provide to the user any answer in a displayed manner. User system 305 may also be a mobile phone with a type of voice recognition system to allow the user to generate an oral inquiry and to provide any answer through a speaker. Alternative embodiments may provide many other types of devices and methods to allow a user to generate a query and to display or otherwise provide any answer to the user.

QA (question/query and answer) system 320 includes a natural language processing (NLP) based user interface 325, a QA manager 330, user database 332, analytical models 335 and a set of databases 340 (which may include user database 332). User interface 325 provides an interface from QA manager 330 and user system 305 and can perform a variety of functions including identifying users, utilizing NLP, and formatting/redacting information, all under the management of QA system 320. Some of the functionality of user interface 325 may be provided by user system 305 in alternative embodiments. QA system 320 may include a computing device (comprising one or more processors and one or more memories, and potentially any other computing device elements generally known in the art including buses, storage devices, communication interfaces, and the like) connected to the network 310. QA system 320 and network 310 may enable question/answer (QA) generation functionality for one or more content users. Other embodiments of QA system 320 may be used with components, systems, sub-systems, and/or devices other than those that are depicted herein.

QA system 320 may be configured to receive inputs from various sources. For example, QA system 320 may receive input from network 310, a corpora of electronic documents 350, a content creator, content users, and other possible sources of input. In one embodiment, some or all of the inputs to QA system 320 may be routed through network 310. The various computing devices on the network may include access points for content creators and content users. Some of the computing devices may include devices for a database storing the corpus of data. The network may include local network connections and remote connections in various embodiments, such that QA system may operate in environments of any size, including local and global, e.g., the Internet. Additionally, QA system 320 serves as a front-end system that can make available a variety of knowledge extracted from or represented in documents, network-accessible sources and/or structured data sources. In this manner, some processes populate the knowledge manager with the knowledge manager also including input interfaces to receive knowledge requests and respond accordingly.

A content creator creates content in a document or other corpus for use as part of corpora with QA system. The document may include any file, text, article, or source of data for use in QA system 320. Content users may access QA system 320 via a network connection or an Internet connection to network 310, and may input questions to QA system 320 that may be answered by the content in the corpus of data. When a process evaluates a given section of a document for semantic content, the process can use a variety of conventions to query it from the QA system. One convention is to send a well-formed question. Semantic content is content based on the relation between signifiers, such as words, phrases, signs, and symbols, and what they stand for, their denotation, or connotation. In other words, semantic content is content that interprets an expression, such as by using natural language processing (NLP). In one embodiment, the process sends well-formed questions (e.g., natural language questions, etc.) to the knowledge manager. QA system 320 may interpret the question and provide a response to the content user containing one or more answers to the question. In some embodiments, QA system 320 may provide a response to users in a ranked list of answers.

QA system 320 may be the IBM Watson™ QA system available from International Business Machines Corporation of Armonk, N.Y., which is augmented with the mechanisms of the illustrative embodiments described herein. The knowledge manager system may receive an input question which it then parses to extract the major features of the question, that in turn are then used to formulate queries that are applied to the corpus of data. Based on the application of the queries to the corpus of data, a set of hypotheses, or candidate answers to the input question, are generated by looking across the corpus of data for portions of the corpus of data that have some potential for containing a valuable response to the input question.

The IBM Watson™ QA system then performs deep analysis on the language of the input question and the language used in each of the portions of the corpus of data found during the application of the queries using a variety of reasoning algorithms. There may be hundreds or even thousands of reasoning algorithms applied, each of which performs different analysis, e.g., comparisons, and generates a score. For example, some reasoning algorithms may look at the matching of terms and synonyms within the language of the input question and the found portions of the corpus of data. Other reasoning algorithms may look at temporal or spatial features in the language, while others may evaluate the source of the portion of the corpus of data and evaluate its veracity.

The scores obtained from the various reasoning algorithms indicate the extent to which the potential response is inferred by the input question based on the specific area of focus of that reasoning algorithm. Each resulting score is then weighted against a statistical model. The statistical model captures how well the reasoning algorithm performed at establishing the inference between two similar passages for a particular domain during the training period of the QA system. The statistical model may then be used to summarize a level of confidence that the QA system has regarding the evidence that the potential response, i.e. candidate answer, is inferred by the question. This process may be repeated for each of the candidate answers until the QA system identifies candidate answers that surface as being significantly stronger than others and thus, generates a final answer, or ranked set of answers, for the input question. More information about the IBM Watson™ QA system may be obtained, for example, from the IBM Corporation website, IBM Redbooks, and the like.

User interface 325 can handle several functions under the direction of QA manager 330. First, user interface 325 can be utilized to determine the identity of a user or to identify a class of user that the user belongs to under the instruction of QA manager 330 and in concert with user database 332. This will then be utilized to identify the credentials of the user. Credentials are the verified access privilege or security clearance (i.e., access rights) that a user has to view or otherwise access restricted data and data sources. These credentials may be based on various criteria such as whether the user is employed by a certain entity (e.g., governmental or private company), is employed at a certain level within that entity, has a verifiable security clearance, has paid a fee for access credentials such as with certain information brokers and sellers, etc. These credentials can be utilized to determine whether an answer should be redacted such as described below. For example, if the user is not identifiable or is identified as not having appropriate credentials to access sensitive material, then the answers are redacted to hide any sensitive information. However, enough information may be allowed to indicate to the user that better answers may be available with the appropriate credentials.

Second, user interface 325 can process questions from users using NLP to decompose, classify, transform, and otherwise analyze to put those questions in a form easily usable by QA manager 330. For example, user interface 325 can determine from a user system communication that a question has been asked, the class of question (i.e., whether the question is asking for a date, a name, a place, etc.) as well as provide the question in a standard format for processing by QA manager 330. Third, user interface 325 can then take answers received from QA manager 330 and again utilize NLP to provide those answers in a human understandable or appreciated form for transmission back to the user. This process can include formatting the answers appropriate for the user including any redactions imposed by redaction filter 331 based on the previously identified credentials of the user. The redacted and NLP formatted answer can then be provided to user system 305 across network 310 for final communication to the user.

QA manager 330 can take an NLP (natural language processing) decomposed, classified, transformed and otherwise analyzed question and utilize analytical models 335 and databases 340 to determine a set of answers with a corresponding set of confidence in those answers. These answers can be modified by redaction filter 331 based on user credentials described in user database 332 as described below. Those answers can then be communicated to user interface 325 for formatting and transmission to the user. Although redaction filter 331 is illustrated as a sub-module of QA manager 330, it may be tightly incorporated into QA manager 330. Alternatively, redaction filter 331 may be a separate module between and in direct communication with user database 332 and user interface 325. In any case, redaction filter may also have direct communications with user database 332 and user interface 325 as indicated by the dashed arrows. Analytical models 335 include a set of programmed processes or algorithms that can be utilized to generate a set of answers utilizing databases 340. Similar to weather forecasting such as projections of hurricane paths, different models are based on different assumptions, utilize different methods of analysis and provide different results. However, no one model is best in all circumstances. Therefore, the results of the different models will be weighted and combined to provide the best set of answers to a given question. This weighting can vary depending on identified circumstances.

Databases 340 include a set or source documents also referred to herein as source documents (corpora) 350, NLP derived data 360, model weights 370, statistical information 380 and historical data 390. Corpora 350 includes documents and other information or content which can originate from a variety of sources including the internet, on-line and hardcopy publications, private documents, etc. which are in or converted to electronic form. Corpora 350 include public corpora 352 and private corpora 354. Public corpora 352 are webpages, documents, recordings, pictures, or other types of information or content that are publicly available or otherwise not sensitive (such as internal documents that are not sensitive for those accessing the information). That is, there are no concerns about sharing the contents of public or other non-sensitive corpora 352 with any user. Private or sensitive corpora 354 are also webpages, documents, recordings, pictures, or other types of information or content that are not readily publicly available or are otherwise sensitive. This can include information or content that may be confidential or secret due to corporate, governmental, or other security restrictions. This can also include documents or other content or information that is private due to privacy concerns. Other types of corpora can be considered public (non-sensitive) or private for a variety of other reasons. That is, the corpora may be all internal, all external, all public, all private or a mixture thereof depending on the needs of the users.

NLP derived data 360 includes search indices 362 and other data 364 which is derived from corpora 350. That is, corpora 350 are preprocessed to extract search indices 362 and other data 364 for rapid access and analysis by QA manager 330. Search indices 362 can be by word, by phrase, or by other format to capture and index the content of each corpus (document, information or content) within corpora 350. For example, words within a certain distance of each other within a corpus may be readily identified by utilizing the search indices such as the word "penny" within 3 words of "wheatback" to identify a corpus discussing pennies minted between 1909 and 1959. Search indices can include certain relevant data for a given corpus such as when and where it was published, whether the underlying corpus is public or private, etc. Other data 364 can include other information relating to the corpora such as classifications of documents to describe whether a given documents (e.g. magazine, webpage) is fact or fiction based, reliability of that document, etc.

Model weights 370 includes weights applied to the various analytical models 335 which may be utilized for determining the probability and/or confidence that certain answers are correct. For example, many models may be utilized to provide an answer with three models weighted 30% and another model weighted 10%. The results are then derived from a weighted average or other combination of each model's results. These weights may vary based on various factors such as the type of question, the subject area, etc. These weights can be determined and adjusted through various tests demonstrating which models work best in different situations. This can include analyzing an underlying set of test data used to develop the models as well as analyzing actual questions and responses as the models are utilized in an implementation. Such test data as well as actual questions and answers may be stored as historical data 390. Statistical information 380 can include information generated while analyzing historical data 390 to generated model weights 370. Additional types of statistical information may be gathered over time such as demographics of users. By storing such statistical information, future statistical analysis can build upon prior analysis so that the QA system can be improved over time. These improvements can include improvements to model weights 370 as well as possible improvements to the underlying analytical models 335. To help prevent the inadvertent leakage of private information, historical data may be segregated into public data 392 and private data 394.

FIGS. 4A to 4F are pictorial diagrams of a user interface in which various embodiments may be implemented. These diagrams may be of a webpage, an application interface, or other interface which the user can access through a user system such as described above. Each diagram illustrates a user interface page which may be part of a window or other larger displayed element. In these diagrams, the pages are shown in English, although other languages may be utilized.

Figure 4A:
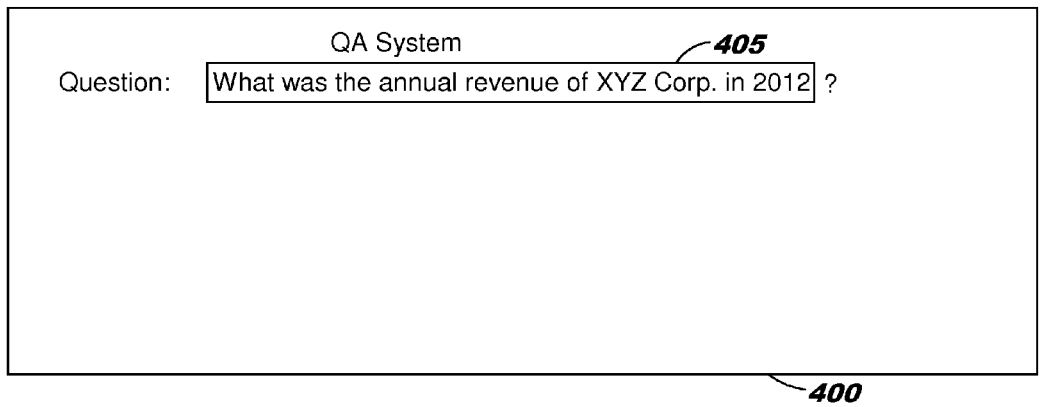
FIG. 4A to 4F are pictorial diagrams of a user interface in which various embodiments may be implemented.
Figure 4B:
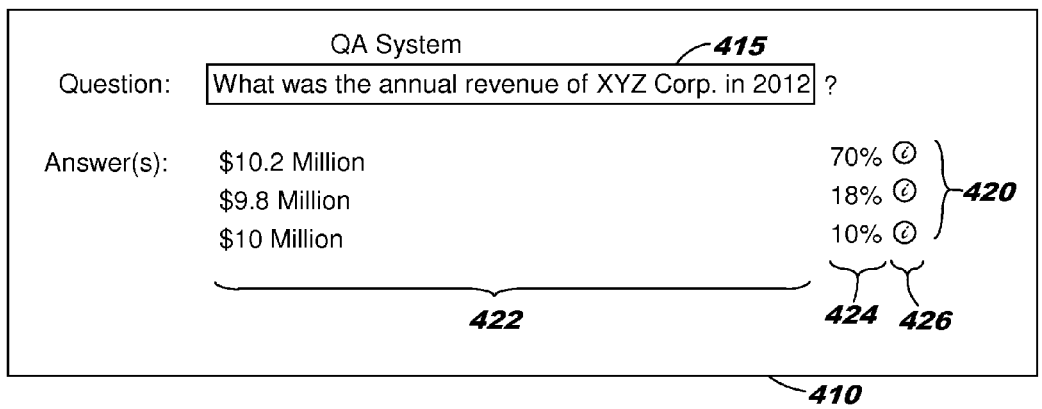

FIG. 4A illustrates an opening page 400 where a user can ask a question in question area 405 using natural language. A question has been entered by a user in question area 405. This question is seeking a monetary number as can be determined utilizing natural language processing. Question area 405 may expand as the user types the question to include longer questions. FIG. 4B illustrates an answer page 410 where the previously entered question is presented in question area 415 and the answer is provided in answer area 420. In this example, there are three answers shown in field 422, each with a confidence 424 and an information button 426. The answers and confidence can be determined utilizing the QA system described in FIG. 3 above or through alternative systems. Each answer 422 is shown in this example because the user is deemed to have the appropriate credentials or the answers are deemed to be not sensitive. The confidence 424 is a weighting or statistical confidence in each answer utilizing techniques known to those of ordinary skill in the art. Typically, the confidences will add up to less than 100%. Information buttons 426 may be pressed or clicked by the user to view the underlying source document(s) that provide the answer. For example, the first answer with the highest confidence may be from a credit reporting agency, the second answer from a trade publication, and the third answer may come from public statements by a representative of XYZ Corporation in a local newspaper. If the user does not have the credentials to view certain sensitive source documents, then any references to those sensitive source documents will be redacted so the user cannot access them. Each source document may have information about its reliability as described above with reference to other data 364.

Figure 4C:
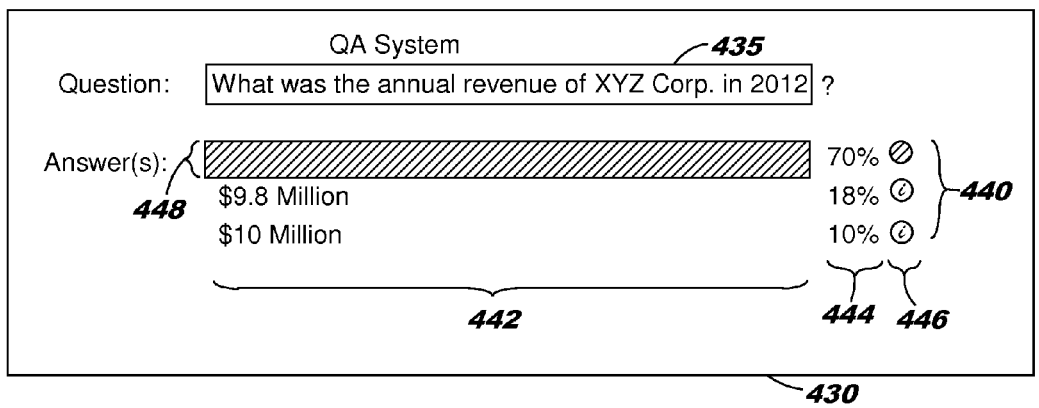

FIG. 4C illustrates an answer page 430 where certain information may be redacted due to the sensitivity of that information and the lack of credentials of the user. The redaction in this case is performed by blacking out the sensitive information. The previously entered question is presented in question area 435 and the answer is provided in answer area 440. In this example, there are two answers and one redacted answer 448 shown in field 442, each with a confidence 444 and an information button 446. The information button for redacted answer is also redacted as the underlying source documents cannot be revealed to the user. Alternatively, the information button for answer 448 may not be redacted to allow the user to request the information redacted and be allowed to present his or her credentials. The redacted information button may also be kept active for the user to press or click to request the redacted information. However, if the user does not have the credentials to view certain sensitive source documents, then any references to those sensitive source documents will be redacted so the user cannot access them. The answers and confidence in each answer can be determined utilizing the QA system such as described above. As illustrated in this figure, the user is allowed to see that there is a better answer with a high confidence. In some embodiments, the set of answers may include a single best answer. In such embodiments, the second best answer may be displayed with an indication that the best answer is hidden and available with further authentication or a fee.

In some alternative embodiments, the source information may be displayed along with the answers to provide support. However, if some source information is considered sensitive, then that sensitive source material should be redacted, even if the resulting answer may not be sensitive or redacted. The answers and any supporting source material (evidence) are collectively referred to herein as answer information including a set of answer information items. It is the sensitive portions of that answer information which is redacted, whether it is the answer or the underlying source material.

Figure 4D:
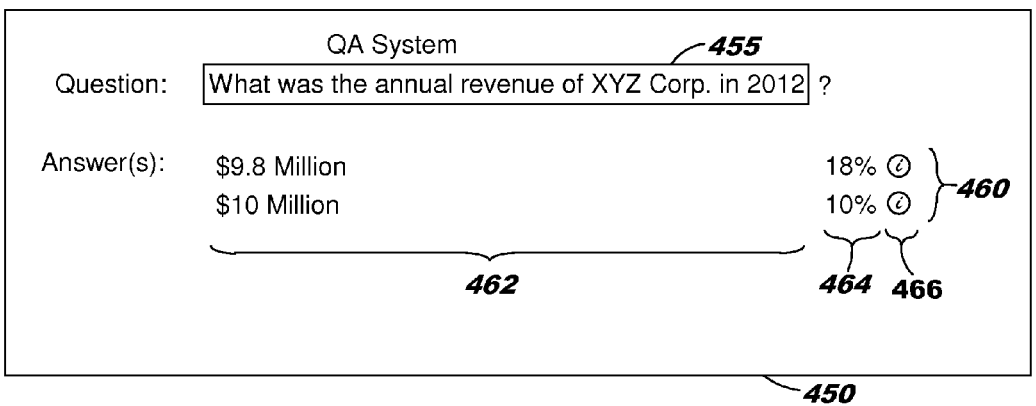

FIG. 4D illustrates an answer page 450 where certain information may be redacted due to the sensitivity of that information and the lack of credentials of the user. The redaction in this case is performed by removing the sensitive information. The previously entered question is presented in question area 455 and the answer is provided in answer area 460. In this example, there are two answers shown in field 462, each with a confidence 464 and an information button 466. Even if an answer is not sensitive, there may be sensitive source documents used with public or other non-sensitive documents to generate that non-sensitive answer. If the user presses the information button and if the user does not have the credentials to view certain sensitive source documents, then any references to those sensitive source documents will be redacted so the user cannot access them. As illustrated in this figure, the user is not allowed to see that there is a better answer with a high confidence, although the user can see that the answers provided have a low confidence.

Figure 4E:
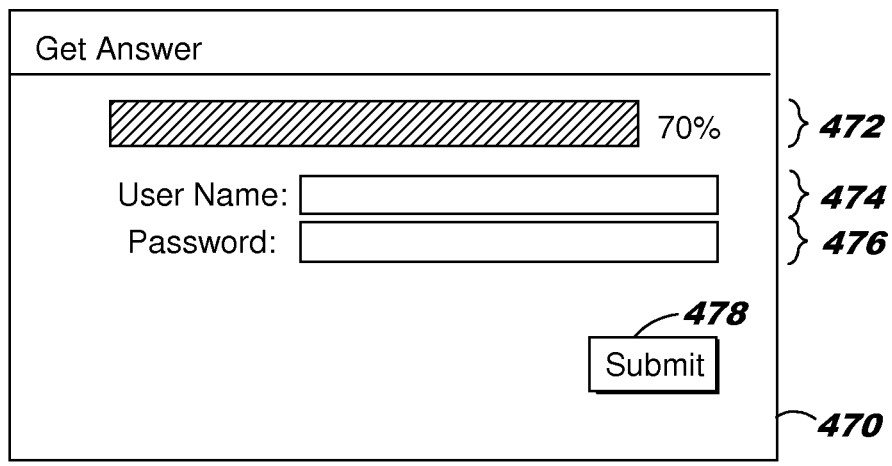

FIG. 4E illustrates a pop up box 470 or other element where a user can submit 478 a user name or other identifier 474 and password 476 to obtain the requested answer 472. The user can press or click on a redacted answer or information button such as shown in FIG. 4C above to initiate pop up box 470. Alternatively, the user may right click the answer area or use alternatively techniques to initiate pop up box 470. In another alternative, the user may provide the requested information prior to asking a question. After entering user name 474 and password 476 and then pressing or clicking submit button 478, the QA system can check the user database to determine if the user has the necessary credentials to view the sensitive information that has been redacted. If yes, then the information is displayed such as shown above with reference to FIG. 4C. Otherwise, the information is not provided.

Figure 4F:
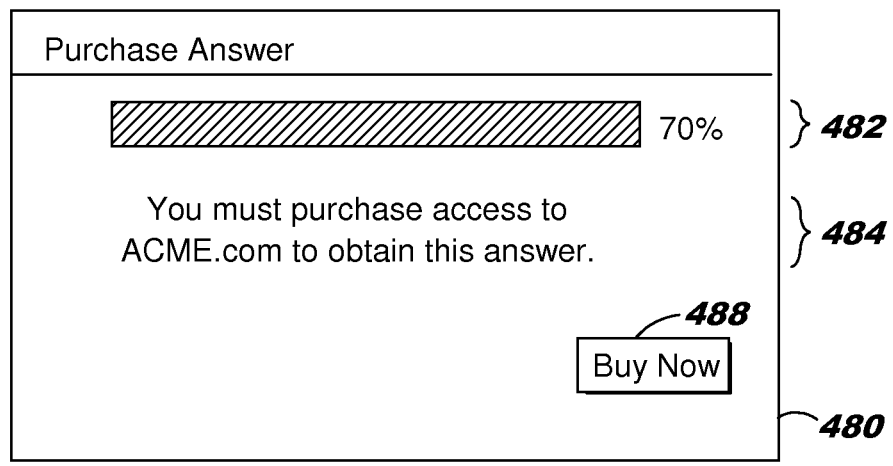

FIG. 4F illustrates a pop up box 480 or other element where a user can initiate payment 488 as described in instruction field 484 to obtain the requested answer 482. The user can press or click on a redacted answer or information button such as shown in FIG. 4C above to initiate pop up box 480. Alternatively, the user may right click the answer area or use alternatively techniques to initiate pop up box 480. Instruction field 484 explains the process needed to obtain the answer. This description can include the price for that information. The user then presses or clicks on button 488 to go through a process for purchasing the requested information.

Figure 5:
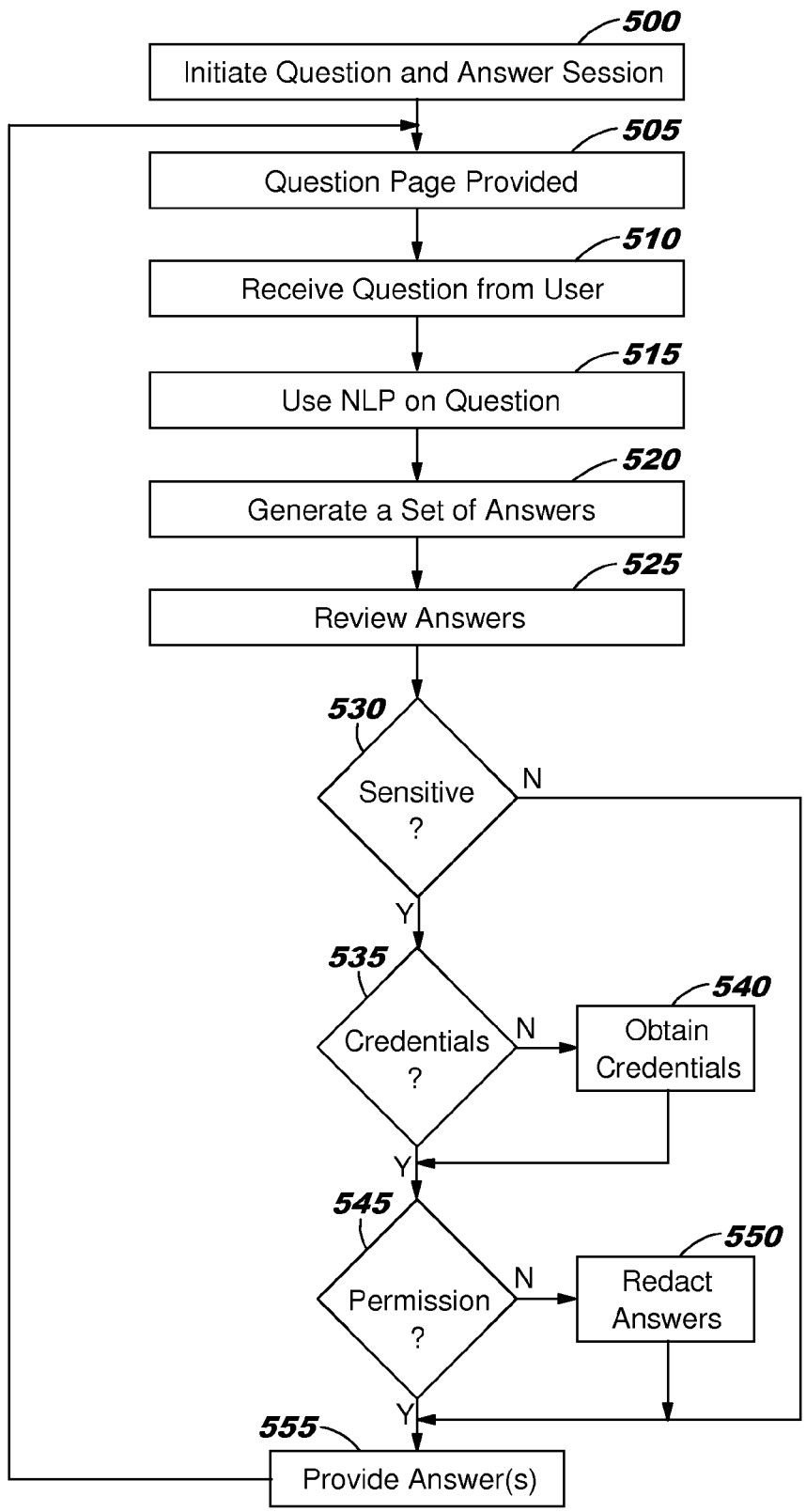
FIG. 5 is a flow diagram of generating and redacting answers in accordance with a first embodiment.

FIG. 5 is a flow diagram of generating and redacting answers in accordance with a first embodiment. In a first step 500, a question and answer session is initiated with a user by the user interface. This can be accomplished by the user opening an application within a user device, by the user opening a webpage with an internet browser, or other methods of initiating a session. This initiation process can include establishing a secure connection with the user including receiving and verifying the credentials of the user. In a second step 505, a question page such as shown in FIG. 4A above is provided to the user device and displayed to the user. In a third step 510, a question is received from the user through the user device to the user interface.

In a subsequent step 515, the user question is decomposed, classified, transformed and otherwise analyzed by the user interface utilizing natural language processing to an easily managed query. Then in step 520, the QA system takes the query and generates a set of answers, each answer having a percentage or other measure of confidence as well as identifiers for a set of sources for that answer. The source identifiers are a provenance for each source and can include identifiers for the corpus, the document, the page, the passage, etc. of each source utilized to generate each answer. The answer and any supporting source material including source identifiers are collectively referred to herein as answer information including a set of answer information items. It is the sensitive portions of that answer information which is redacted, whether it is the answer or the underlying source material. In addition, any graphical user interface to access sensitive answer information may be similarly redacted depending on the circumstances. This process is described below with reference to FIGS. 7A and 7B. In a subsequent step 525, the redaction filter then reviews the sources of each answer. Then in step 530, the redaction filter determines whether any of the answers contain sensitive information. If yes, the processing continues to step 535, otherwise processing proceeds to step 555 below.

In step 535, it is determined whether the user has already provided his or her credentials. If yes, then processing continues to step 545. If not, then in step 540, the credentials are obtained from the user and processing continues to step 545. The credentials may be a user identifier and password, a set of secure information provided automatically by the user system, a payment made by the user for access, etc. In step 545, the user credentials are compared to the sensitive information to determine whether the user has permission to access the sensitive information. If the user has permission, then processing continues to step 555. If the user does not have permission, then in step 550 the answer is redacted such as shown in FIGS. 4C and 4D above. The type of redaction is in accordance with the implementation of the QA system. The type of redaction can be based on the credentials or the lack thereof from the user. For example, if a user does not provide any identifiable or verifiable credentials, then the redacted answer may appear as shown in FIG. 4D above. If the user does provide verifiable credentials, but the credentials are insufficient to provide an answer to the user, then the redacted answer may appears as shown in FIG. 4C above. Alternative embodiments may utilize alternative redaction schemes. Processing then continues to step 555 where the answers provided by the QA system, redacted or not, are provided to the user through the user interface and user system. When the answers are presented to the user, the user may be able to request the underlying source documents utilized for generating that answer. Those source documents or references (e.g., web links) to those source documents may then be provided to the user. However, if the user does not have the credentials to view certain sensitive source documents, then any references to those sensitive source documents will be redacted so the user cannot access them. Processing then returns to step 505 above.

Figure 6:
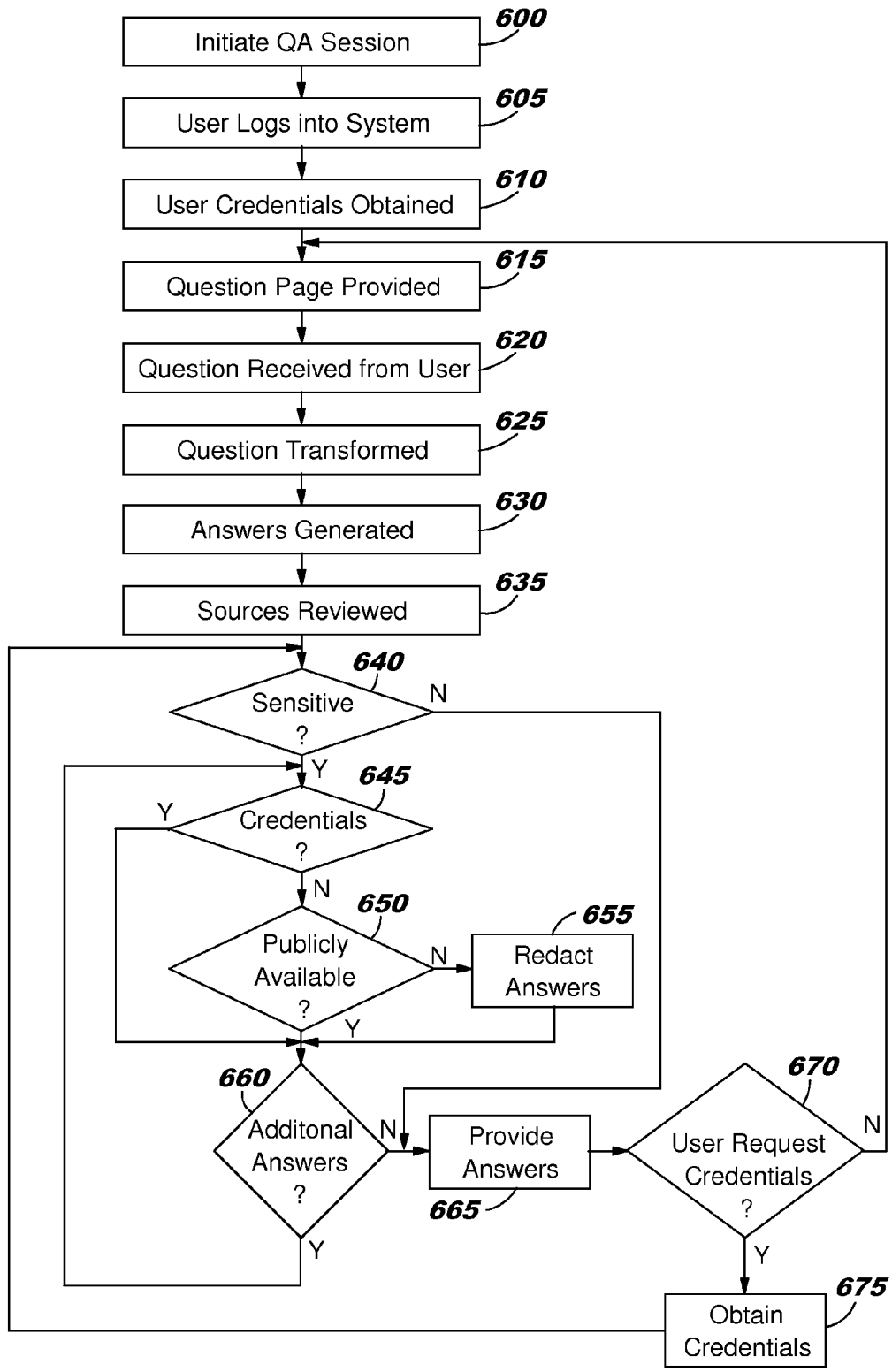
FIG. 6 is a flow diagram of generating and redacting answers in accordance with a second embodiment.

FIG. 6 is a flow diagram of generating and redacting answers in accordance with a second embodiment. In this embodiment, there are two levels of sensitive information and user credentials which are obtained up front. This embodiment can provide greater protection of sensitive information in many circumstances. In a first step 600, a question and answer session is initiated with a user by the user interface. This can be accomplished by the user opening an application within a user device, by the user opening a webpage with an internet browser, or other methods of initiating a session.

In a second step 605, the user logs into the system using a userid and password or other types of authentication such as using biometrics. The user may even be a software program or a software agent for a user. In such as case, the authentication may be through the use of secure encryption keys. Once the user logs into the system, then in step 610, the system obtains the credentials of the user from the user database. These credentials may have been previously obtained and verified for each user to build the user database. The user database may have been established using a variety of techniques such as by querying an employee database within a company or other entity. For example, if the user is a member of the human relations department, that user may be granted access to a large variety of sensitive information compared to an engineer who may be granted access to sensitive information specific to a certain technology. For another example, a person working for one governmental agency may be granted access to sensitive information within that agency, but not other agencies. The user database may have been established with users paying an annual fee. For example, the user may be able to obtain different levels of access of sensitive information depending on how much the user pays for a subscription. That is, there may be several subscription levels depending on the type of sensitive information that the user is willing to purchase. For illustrative purposes, this embodiment is limited to two levels of sensitivity. However, many levels and types of sensitivity may be implemented, and those levels or types may not be hierarchical. For example, three different users may all be able to access different types of sensitive information not accessible by the other users.

Then in step 615 a question page such as shown in FIG. 4A above is provided to the user device and displayed to the user. In a subsequent step 620, a question is received from the user through the user device to the user interface. In step 625, the user question is decomposed, classified, transformed and otherwise analyzed by the user interface utilizing natural language processing to an easily managed query.

Then in step 630, the QA system takes the query and generates a set of answers, each answer having a percentage or other measure of confidence as well as identifiers for a set of sources for that answer. The source identifiers are a provenance for each source and can include identifiers for the corpus, the document, the page, the passage, etc. of each source utilized to generate each answer. This process is described below with reference to FIGS. 7A and 7B. In a subsequent step 635, the redaction filter then reviews the sources of each answer. In step 640, the redaction filter determines whether any of the answers contain sensitive information. If yes, the processing continues to step 645, otherwise processing proceeds to step 665 below.

In step 645, the corpora sources for one of the answers are checked to see whether the user has the credentials for accessing all of those sources. If not, then processing continues to step 650 to determine whether that answer is available from corpora sources other than sources that the user does not have the credentials to access. If no in step 650, then in step 655 the answer is redacted and processing continues to step 660. The type of redaction is in accordance with the implementation of the QA system. The type of redaction can be based on the credentials or the lack thereof from the user. For example, the redaction may be in the form of FIG. 4C where the user can see that an answer was redacted. However, if the source of information is particularly sensitive and the user has a low level of credentials to view sensitive information, then the redaction may be in the form of FIG. 4D where the user cannot see that an answer was redacted. Alternative embodiments may utilize alternative redaction schemes. If yes in steps 645 or 650, then the answer is not redacted and processing continues to step 660. In step 660, it is determined whether there are any additional answers to be reviewed for sensitive sources. If yes, then processing returns to step 645, otherwise processing continues to step 665. In step 665 the QA system provides the answers, redacted or not, to the user through the user interface and user system. When the answers are presented to the user, the user may be able to request the underlying source documents utilized for generating that answer. Those source documents or references (e.g., web links) to those source documents may then be provided to the user. However, if the user does not have the credentials to view certain sensitive source documents, then any references to those sensitive source documents will be redacted so the user cannot access them. Then in step 670, it is determined whether the user seeks additional credentials, such as when certain answers have been redacted. If not, then processing returns to step 615 for the next user question, otherwise the user credentials are obtained in step 675. This can involve the user providing additional, information indicating his or her right to access certain information. It can also involve the user paying for those credentials. Once received, then processing returns to step 640 to reprocess the answers based on the new credentials.

Figure 7A:
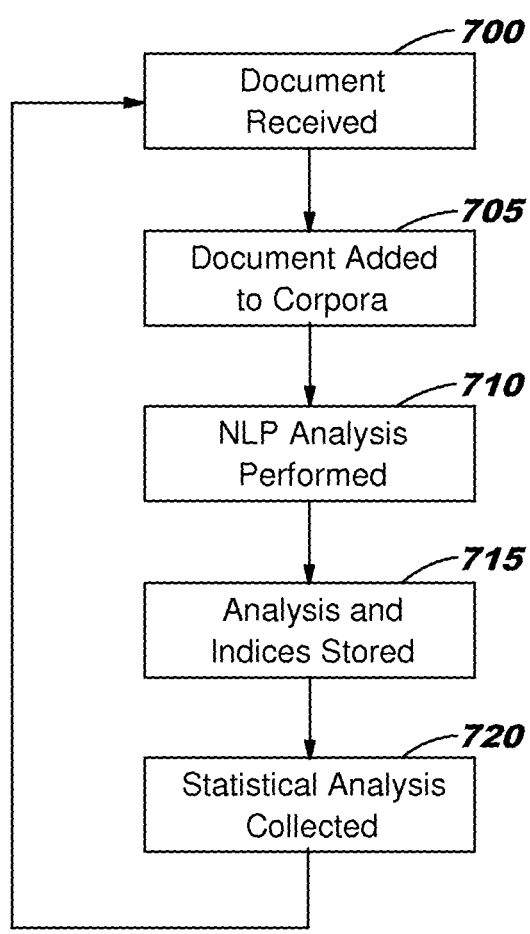
FIGS. 7A and 7B are a flow diagrams of generating a set of answers for possible redaction in which various embodiments may be implemented.
Figure 7B:
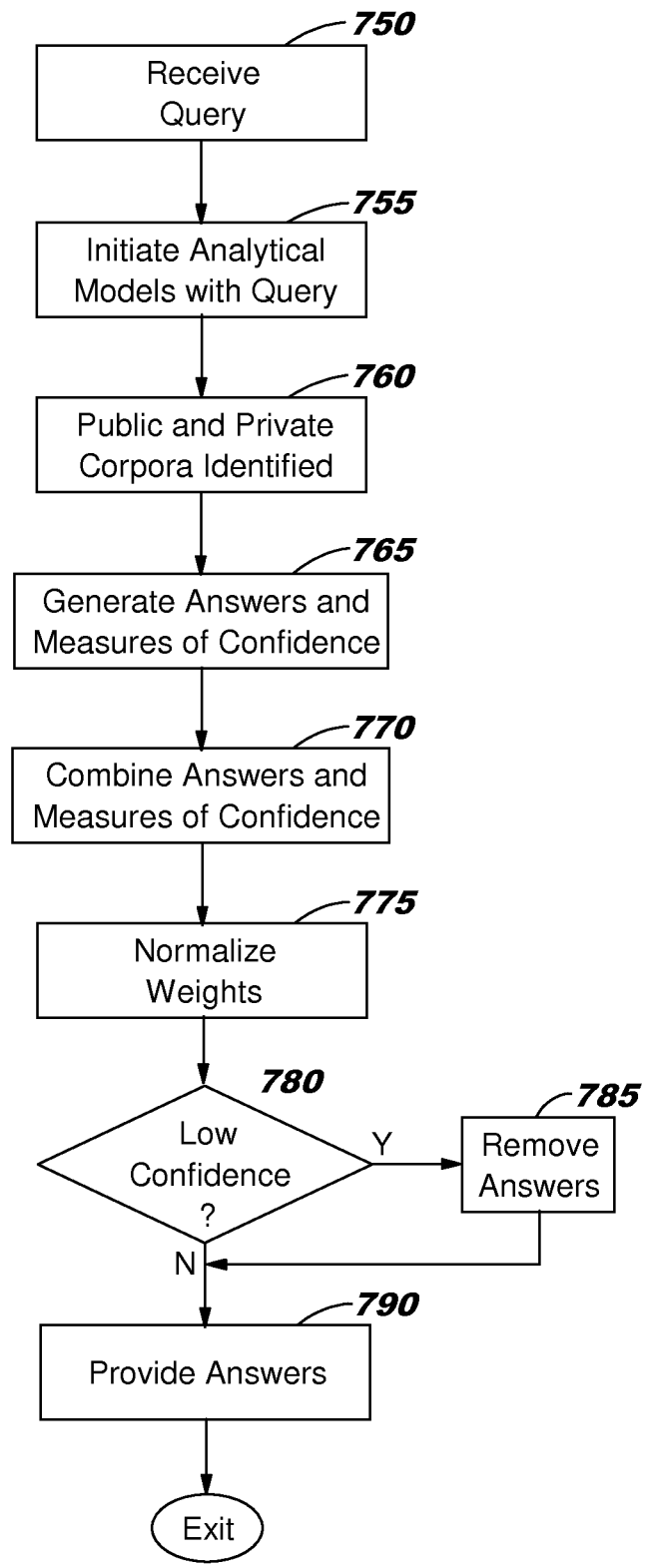

FIGS. 7A and 7B are flow diagrams of generating a set of answers for possible redaction in which various embodiments may be implemented. FIG. 7A is a flow diagram of collecting and analyzing a set of source documents which then can be utilized for generating answers. In a first step 700, a document is received for addition to the corpora. In step 705, a record of the document is created in the corpora database including an identifier of the document and any sensitivity of the document. In step 710, the document is parsed, indexed, classified and catalogued utilizing natural language processing (NLP). This includes identifying the type of document (such as whether it originates from an encyclopedia or a webpage), reliability of the document, sensitivity of the document, as well as indices of the document such as identifying the relative location of keywords within the document. This information is then stored in into an NLP derived database with the document identifier in step 715. Additional statistical information may be collected or otherwise accumulated from the document such as size, age, etc. and stored in a statistical information database in step 720. This statistical information may be useful later for performing statistical analysis of the corpora and possibly for improving the analytical models. Processing then returns to step 700 for processing the next document.

FIG. 7B is a flow diagram of generating a set of answers for possible redaction. In a first step 750, an NLP analyzed query is received including classification and other analytical data from the user interface. Then in step 755, the analytical models are provided the query and analytical data. In step 760, each model utilizes the search indices and other data to identify a set of public corpora and private corpora, and their source identifiers, for use in identifying answers to the query. The source identifiers are a provenance for each corpora source and can include identifiers for the corpus, the document, the page, the passage, etc. of each source utilized to generate each answer. In step 765, each analytical model utilizes the identified public and private corpora to generate a set of answers, each answer having a percentage or other measure of confidence as well as the identifiers of the corpora sources for that answer. This can involve identifying factual information from the public and private corpora based on the search indices and other data. In many cases, the search indices alone may be sufficient to provide the answers without necessarily accessing the source corpora.

Then in step 770, the sets of answers from each model are combined utilizing a set of model weights depending on the classification and other analytical data from the user interface. This combination typically includes multiple answers, each with a weighted measure of confidence. For example, answers derived from works of fiction would have a much lower measure of confidence than answers derived from respected reference sources. In step 775, the weighted measures of confidence are then normalized for each answer. In step 780, it is determined whether there are an excessive number of answers with a very low weighting. For example, if there are 20 answers with 15 of those answers having a normalized measure of confidence less than 1%, then those 15 answers may be removed and not utilized. This is not redaction for sensitivity reasons, but for avoiding providing an excessive number of answers with a low probability of being correct. If yes in step 780, then those answers are removed in step 785. Processing then continues to step 790. In step 790, the resulting answers with their weighted measure of confidence and identifiers of corpora sources are then passed to the redaction filter for possible redaction. Processing then ceases until the next query is received.

FIGS. 8A to 8E are block diagrams of types of database records in which various embodiments may be implemented. A record is a set of information within a domain or database that establishes a relationship between a set of data or data elements. A record may be a separate entry into a database, a set of links between data, or other logical relationship between a set of data. FIG. 8A is a block diagram of a record 800 stored in a source document (corpora) database. FIG. 8B is a block diagram of a record 820 stored in an NLP derived database which is utilized to quickly access corpora records. FIG. 8C is a block diagram of a record 840 stored in a model weights database utilized to weigh results from analytical models. FIG. 8D is a block diagram of a record 860 stored in historical database 390 used to retain historical data for future statistical analysis. FIG. 8E is a block diagram of a record 880 stored in a user database. The records described below are examples and alternative embodiments may utilize other structures and types of data utilized for implementation.

FIG. 8A is a block diagram of a record 800 stored in a source document (corpora) database. As described above, a source document, information or content can be a human or machine generated publication, webpage, picture, sound or other document or content which may be sensitive or publicly available. There may be one record for each document, group of documents, or portion of a document. Each record includes a document identifier (ID) 802, sensitivity information 804, and the document itself 806. The document identifier is a unique number or other identifier for quickly identifying and accessing the document. Sensitivity information 804 includes information about whether the document is sensitive and what credentials are needed to access that document. Document 806 includes the actual text, picture, sound, etc. that forms the document.

FIG. 8B is a block diagram of a record 820 stored in an NLP derived database which is utilized to quickly access corpora records. There may be one record for each record in the corpora database, although multiple records may be utilized. Record 820 include a document identifier 822 to cross reference with the corpora database, sensitivity information 824, type of document 826 (such as whether it originates from an encyclopedia or a webpage), reliability of the document 828, as well as indices of the document 830 such as identifying the relative location of keywords within the document. This information can then be utilized to quickly identify relevant documents for answering any questions.

FIG. 8C is a block diagram of a record 840 stored in a model weights database utilized to weigh results from analytical models. This includes one record for each set of weights that may be utilized. That is, a question with a certain type of question, the subject area classification, user profile, etc. may have a different set of weights applied based on statistical analysis of training and actual sample data. Record 840 includes question type 842, question classification 844, user profile 846, other characteristics 848 and analytic model weights 850. Weights 850 can include a weighting factor for every model that may be utilized.

FIG. 8D is a block diagram of a record 860 stored in historical database 390 used to retain historical data for future statistical analysis. This is to capture actual data or samples of actual data for future analysis and use. Record 860 includes an NLP analyzed question 862, the proposed answers 864 prior to redaction (which may require that certain data be segregated for protecting that information), the sensitivity 866 of each answer, the measure of confidence 868 of each answer, and other data 870 that may be useful for storage including the user profile of the person that asked the question.

FIG. 8E is a block diagram of a record 880 stored in a user database. This is to allow a user or an entity to provide his or her credentials for immediate or future use. Record 880 includes a user identifier 882, password 884 to allow the user to log in as desired. Record 880 also includes a user profile 886 for use in providing greater improvement of analytical model weighting. Further included are user credentials 888 for allowing that user to access certain sensitive information.

The invention can take the form of an entirely software embodiment, or an embodiment containing both hardware and software elements. In a preferred embodiment, the embodiments are implemented in software or program code, which includes but is not limited to firmware, resident software, and microcode.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM), or Flash memory, an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Further, a computer storage medium may contain or store a computer-readable program code such that when the computer-readable program code is executed on a computer, the execution of this computer-readable program code causes the computer to transmit another computer-readable program code over a communications link. This communications link may use a medium that is, for example without limitation, physical or wireless.

A data processing system suitable for storing and/or executing program code will include at least one processor coupled directly or indirectly to memory elements through a system bus. The memory elements can include local memory employed during actual execution of the program code, bulk storage media, and cache memories, which provide temporary storage of at least some program code in order to reduce the number of times code must be retrieved from bulk storage media during execution.

A data processing system may act as a server data processing system or a client data processing system. Server and client data processing systems may include data storage media that are computer usable, such as being computer readable. A data storage medium associated with a server data processing system may contain computer usable code such as for managing user access to query results. A client data processing system may download that computer usable code, such as for storing on a data storage medium associated with the client data processing system, or for using in the client data processing system. The server data processing system may similarly upload computer usable code from the client data processing system such as a content source. The computer usable code resulting from a computer usable program product embodiment of the illustrative embodiments may be uploaded or downloaded using server and client data processing systems in this manner.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to explain the principles of the invention, the practical application, and to enable others of ordinary skill in the art to understand the invention for various embodiments with various modifications as are suited to the particular use contemplated.

The terminology used herein is for the purpose of describing particular embodiments and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer usable program product comprising a non-transitory computer usable storage medium including computer usable code for use in redacting QA system answer information based on user access to content, the computer usable program product comprising code for performing the steps of:

analyzing a corpora of documents by natural language processing techniques, wherein the corpora includes non-sensitive corpora with non-sensitive content and sensitive corpora with sensitive content, and storing the analyzed corpora in memory with a sensitivity indicator for each corpus of the sensitive corpora;

receiving a user question to be answered by utilizing the analyzed corpora including the non-sensitive and sensitive content;

utilizing a processor to determine a set of answer information items by processing using the corpora, each answer information item including references to each corpus utilized to determine that answer information item;

determining a user access right to sensitive content; and redacting an answer information item from the set of answer information items if sensitive content to which the user does not have access was used to determine the answer information item.

2. The computer usable program product of claim 1 wherein each of the set of answer information items includes a corresponding measure of confidence.

3. The computer usable program product of claim 2 wherein redacting the answer information item does not include redacting the corresponding measure of confidence.

4. The computer usable program product of claim 2 wherein redacting the answer information item includes redacting the corresponding measure of confidence while not affecting the corresponding measure of confidence for answer information not redacted.

5. The computer usable program product of claim 1 further comprising presenting the user with an option to submit credentials to gain access to the redacted answer information item.

6. The computer usable program product of claim 1 further comprising presenting the user with an option to purchase access to the redacted answer information item.

7. The computer usable program product of claim 1 further comprising:

prior to redacting an answer information item, determining whether there is non-sensitive corpus utilized to determine that answer information item; and upon a positive determination, not redacting the answer information item, but redacting user access to any sensitive corpus utilized to determine that answer information item.

8. The computer usable program product of claim 1 wherein the sensitive content is categorized into multiple categorizes of sensitivity and wherein the user right to content includes credentials to obtain user access to a subset of the categories of sensitive content.

9. The computer usable program product of claim 1 further comprising receiving a user request to view source documents for an answer information item; and redacting any references to source documents containing sensitive content to which the user does not have access right.

10. A data processing system for redacting QA system answer information based on user access to content, the data processing system comprising:

a processor; and a memory storing program instructions which when executed by the processor execute the steps of:

analyzing a corpora of documents by natural language processing techniques, wherein the corpora includes non-sensitive corpora with non-sensitive content and sensitive corpora with sensitive content, and storing the analyzed corpora in memory with a sensitivity indicator for each corpus of the sensitive corpora;

receiving a user question to be answered by utilizing the analyzed corpora including the non-sensitive and sensitive content;

utilizing the processor to determine a set of answer information items by processing using the corpora, each answer information item including references to each corpus utilized to determine that answer information item;

determining a user access right to sensitive content; and redacting an answer information item from the set of answer information items if sensitive content to which the user does not have access was used to determine the answer information item.

11. The data processing system of claim 10 wherein each of the set of answer information items includes a corresponding measure of confidence.

12. The data processing system if claim 11 wherein redacting the answer information item does not include redacting the corresponding measure of confidence.

13. The data processing system of claim 11 wherein redacting the answer information item includes redacting the corresponding measure of confidence while not affecting the corresponding measure of confidence for answer information not redacted.

14. The data processing system of claim 10 further comprising presenting the user with an option to submit credentials to gain access to the redacted answer information item.

15. The data processing system of claim 10 further comprising presenting the user with an option to purchase access to the redacted answer information item.

16. The data processing system of claim 10 further comprising:

prior to redacting an answer information item, determining whether there is non-sensitive corpus utilized to determine that answer information item; and upon a positive determination, not redacting the answer information item, but redacting user access to any sensitive corpus utilized to determine that answer information item.

17. The data processing system of claim 10 wherein the sensitive content is categorized into multiple categorizes of sensitivity and wherein the user right to content includes credentials to obtain user access to a subset of the categories of sensitive content.

18. The data processing system of claim 10 further comprising receiving a user request to view source documents for an answer information item; and redacting any references to source documents containing sensitive content to which the user does not have access right.

* * * * *